(12) United States Patent
Alber et al.

(10) Patent No.: US 11,809,541 B2
(45) Date of Patent: Nov. 7, 2023

(54) METHOD FOR OBTAINING EMERGENCY DEVICE ACCESS FOR FIELD DEVICES

(71) Applicant: Endress+Hauser Conducta GmbH+Co. KG, Gerlingen (DE)

(72) Inventors: Thomas Alber, Stuttgart (DE); Martin Lohmann, Gerlingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 198 days.

(21) Appl. No.: 17/481,910

(22) Filed: Sep. 22, 2021

(65) Prior Publication Data

US 2022/0094541 A1    Mar. 24, 2022

(30) Foreign Application Priority Data

Sep. 24, 2020  (DE) ...................... 10 2020 124 909.8

(51) Int. Cl.
*G06F 21/34*   (2013.01)
*H04L 9/08*    (2006.01)
*H04L 9/30*    (2006.01)

(52) U.S. Cl.
CPC .............. *G06F 21/34* (2013.01); *H04L 9/088* (2013.01); *H04L 9/30* (2013.01)

(58) Field of Classification Search
CPC ...................................................... G06F 21/34
See application file for complete search history.

(56) References Cited

U.S. PATENT DOCUMENTS

| | | | |
|---|---|---|---|
| 6,609,197 B1 * | 8/2003 | Ketcham ................ | H04L 63/20 713/182 |
| 8,719,952 B1 | 5/2014 | Damm-Goossens | |
| 10,255,422 B1 * | 4/2019 | Last .................... | G06V 40/1306 |
| 10,446,016 B2 * | 10/2019 | Mattiaccio, III ..... | G08B 25/016 |
| 2015/0074800 A1 * | 3/2015 | Farraro .................. | G06F 21/40 726/20 |

FOREIGN PATENT DOCUMENTS

| | | |
|---|---|---|
| DE | 102014112611 A1 | 3/2016 |
| DE | 102015121809 A1 | 6/2017 |
| DE | 202018004293 U1 | 10/2018 |
| DE | 102017111939 A1 | 12/2018 |

* cited by examiner

*Primary Examiner* — Bradley W Holder
(74) *Attorney, Agent, or Firm* — Mark A. Logan; Endress+Hauser (USA) Holding, Inc.

(57) ABSTRACT

Disclosed is a method for obtaining emergency device access for field devices in process automation technology by means of a security token. The method includes the field device receiving and storing a public key before an emergency occurs; connecting the security token to the field device; sending a challenge from the field device to the security token; calculating a response to the challenge by means of a private key on the security token and sending the response from the security token to the field device; and granting emergency access if the response is correct.

10 Claims, 2 Drawing Sheets

METHOD FOR OBTAINING EMERGENCY DEVICE ACCESS FOR FIELD DEVICES

CROSS-REFERENCE TO RELATED APPLICATION

The present application is related to and claims the priority benefit of German Patent Application No. 10 2020 124 909.8, filed on Sep. 24, 2020, the entire contents of which are incorporated herein by reference.

TECHNICAL FIELD

The present disclosure relates to a method for obtaining emergency device access for field devices in process automation technology by means of tokens. The present disclosure furthermore relates to a measuring system for carrying out such a method.

BACKGROUND

Field devices require user administration which makes it possible to allow only authorized persons access. Authentication usually takes place via the factor of "knowledge," i.e., the users enter a user name and a password when logging in. If an emergency then occurs in which quick access to the field device is required and no one with sufficient authorization and knowledge of the password is available, it must nevertheless be possible to gain access to the field device so that the emergency can be dealt with. Particularly in an OT environment (operational technology), unlike in the IT environment (information technology), the availability of the devices/system is the highest safety objective.

In an IT environment, i.e., for example, in workstations that are integrated into a domain, it is usually the case that the user can access the workstation with a domain account. When logging into a workstation for the first time, the account is not yet known locally and, after the user name and password are entered, the workstation contacts the domain controller or the directory service for verification. If the directory service confirms the account, the workstation grants access and stores the credentials in such a way that a network connection is no longer necessary for all subsequent accesses.

The situation is very similar if the authentication factor of "possession" in the form of a smart card or multi-factor authentication is used instead. If the user forgets his password and/or loses his hardware token, the user has his password reset by the domain administrator, ensures that his workstation is connected to the company network, and then logs into his workstation with his user name and the reset password. In this way, a user can be helped if he no longer has his access data/media. An emergency solution in which the user can be helped quickly is normally not provided.

In the OT field, e.g., in automation technology, field devices are usually not in the performance class of a workstation and only rarely have an interface that could be used for network-supported user administration. User administration is therefore often configured locally on the field device and therefore only works for this field device. Some field devices have the option of a backup/restore mechanism which therefore allows device settings to be transmitted/copied from one field device to another. This may also include the credentials (user credentials) of the user administration, but this affects the confidentiality and integrity of the data. A similar method is based on the fact that exclusively account data are transmitted via a memory element to a field device from another device or a central station.

Emergency access is not known in field devices. Instead, in this case, use is made of the option of creating an individual account for each employee or of one account being shared by many employees. This increases the probability that, in an emergency, a person with a suitable account (i.e., sufficient authorization and in possession of the password) is available quickly. However, from a user's point of view, the former has the problem that it is very time-consuming to use these individual accounts; and the latter, the use of shared accounts, has the disadvantage from a security point of view that their use cannot be easily controlled, especially when the devices all work in a manner disconnected from a network (offline) and therefore cannot be monitored centrally.

SUMMARY

The present disclosure is based on the object of providing a user of a field device with access to the device in an emergency.

The object is achieved by a method for obtaining emergency device access for field devices in process automation technology by means of a security token, comprising the steps of: the field device receiving a public key if the public key is not yet on the field device, wherein one or more authorizations of the owner of the associated private key but at least access to the field device are linked to the public key; storing the public key on the field device, wherein steps (a) and (b) are performed before an emergency occurs; wherein the token comprises an encrypted memory area (secure element) that is not readable from the outside, wherein a private key is stored in the encrypted memory area, wherein the public and private keys form an asymmetric cryptosystem; connecting the token to the field device; sending a challenge from the field device to the token; calculating a response to the challenge by means of the private key and sending the response from the token to the field device; and granting emergency access if the response is correct; wherein steps (c) through (f) are performed in the event of an emergency; wherein the token is protected against unauthorized use, but the protection can be overcome in an emergency.

An asymmetric cryptosystem is a cryptographic method in which the communicating parties (here: measuring transducer and extension) need not know a common secret key. In general, each user generates his own key pair consisting of a secret part (private key) and a non-secret part (public key). The public key enables anyone to encrypt data for the owner of the private key, check his digital signatures, or authenticate him. The private key enables its owner to decrypt data encrypted with the public key, to generate digital signatures, or to authenticate himself.

The challenge-response method is generally an authentication method of a subscriber based on possession. In this case, a subscriber poses a task (challenge) that the other must solve (response) in order to prove that he has knowledge about a specific piece of information. If a first party wants to authenticate itself to a second party, then the second party sends a random message, such as a random number, to the first party (i.e., the second party poses the challenge). The first party signs the challenge, i.e., applies a cryptological hash function to this message, encrypts this hash value with its private key, attaches this encrypted portion to the message, and sends the result to the second party (and thus delivers the response). The second party, which knows both the random message and the public key of the first party and the hash function used, performs the same hash calculation and compares its result with the result of the attachment, decrypted with the public key, in the response received from the first party. If both data are identical, the first party has successfully authenticated itself.

The security standard IEC62443 for devices from security level 3 describes an emergency mechanism (CR2.1 RE3 "Supervisor Override") in order to be able to quickly access a field device in urgent cases. This contradiction between security and emergency availability is resolved with this concept.

An essential aspect of the present application is to provide a token before the actual emergency and to be able to make it accessible to everyone without having to distribute secrets in the form of passwords to many employees. The token approach does not require central administration and can be easily implemented even for tiny enterprises without great effort. Such a token must of course be protected against unauthorized use, namely in such a way that protection can be overcome by all "rescuers" in an emergency.

In one embodiment, the public key is received in step (a) from the token to the field device via WLAN (standard of the IEEE 802.11 family), Bluetooth, NFC, USB, field bus, Ethernet, SD card, or a proprietary service interface. This service interface is a "CDI interface" of the applicant, for example.

The private and public keys of a key pair cannot be generated separately from one another. Since the private key is generated in the token in one embodiment so that no one learns of it aside from the token, the public key must also be generated in the token. However, the route of the public key from the token to the field device may take any detours and be actively distributed, for example, from a central location to the field devices. The distribution can be wireless or wired. This connection does not necessarily have to be cryptographically secure. If such an infrastructure does not exist, the way remains of the field device reading the public key directly from the token.

One embodiment provides that the token is a hardware token.

Especially in the embodiment in which the token is a hardware token, it is connected to the field device by being inserted into the field device. Someone with administrator access then informs the field device that this inserted token is to be used as an emergency token or security token. The readout of the public key from the token is triggered by use. In so doing, the field device is thus the active part. Lastly, the public key is received and stored (securely) on the field device.

In the embodiment in which the token is a smartphone (see below), the public key is also received in a similar manner. In one embodiment, an app for configuring, using, or generally for establishing contact between the smartphone and the field device is on the smartphone. It is conceivable for the user to send the public key from the smartphone to the field device by means of this app. However, the field device is actually triggered by means of this command to request the public key from the smartphone. Lastly, the public key is received and stored on the field device. Whoever takes the initiative in this case is however irrelevant. One embodiment provides that the field device notices the insertion of the token or the contact with the smartphone and asks the user whether this public key should be transmitted for this purpose.

In one embodiment, an active part exists outside the field device and provides the field device with the instruction to consider the transferred key trustworthy. However, this may not be done by just any person or machine since this would make the method insecure. Sending may therefore only be performed by one authorized entity, especially, after previous authentication.

The term "access to the field device" refers to access to deal with the emergency. Which authorization must be associated therewith depends on the specific individual case. In a simple case, administrator rights are, for example, associated with the token with JOIN (i.e., the transmission of the public key to the field device, thus establishing confidence). However, it is also conceivable that the authorizations are set immediately with JOIN or later (i.e., the issuance of authorizations or assignment to authorization groups, etc.).

One embodiment provides that the hardware token is a FIDO2 stick.

One embodiment provides that the token is a wireless device, especially, a smart device, especially, a smartphone.

One embodiment provides that the connection in step (c) from token to field device takes place via WLAN, Bluetooth, NFC, USB, a proprietary service interface, or a sensor interface. The sensor interface is an interface via which a sensor is connected to the field device, especially if the field device is designed as a measuring transducer (also called a transmitter).

One embodiment provides that the asymmetric cryptosystem is designed as an RSA cryptosystem or elliptical curve cryptosystem.

One embodiment provides that only exactly one field device trusts the public key.

One embodiment provides that the challenge is random.

One embodiment provides that the protection can be irreversibly overcome in an emergency; especially, the protection is destroyed; at least the use of the token is obvious.

In one embodiment, there is an alert and/or a higher-level unit is informed after the token has been used.

BRIEF DESCRIPTION OF THE DRAWINGS

This is explained in more detail with reference to the following figures.

Figure 1:
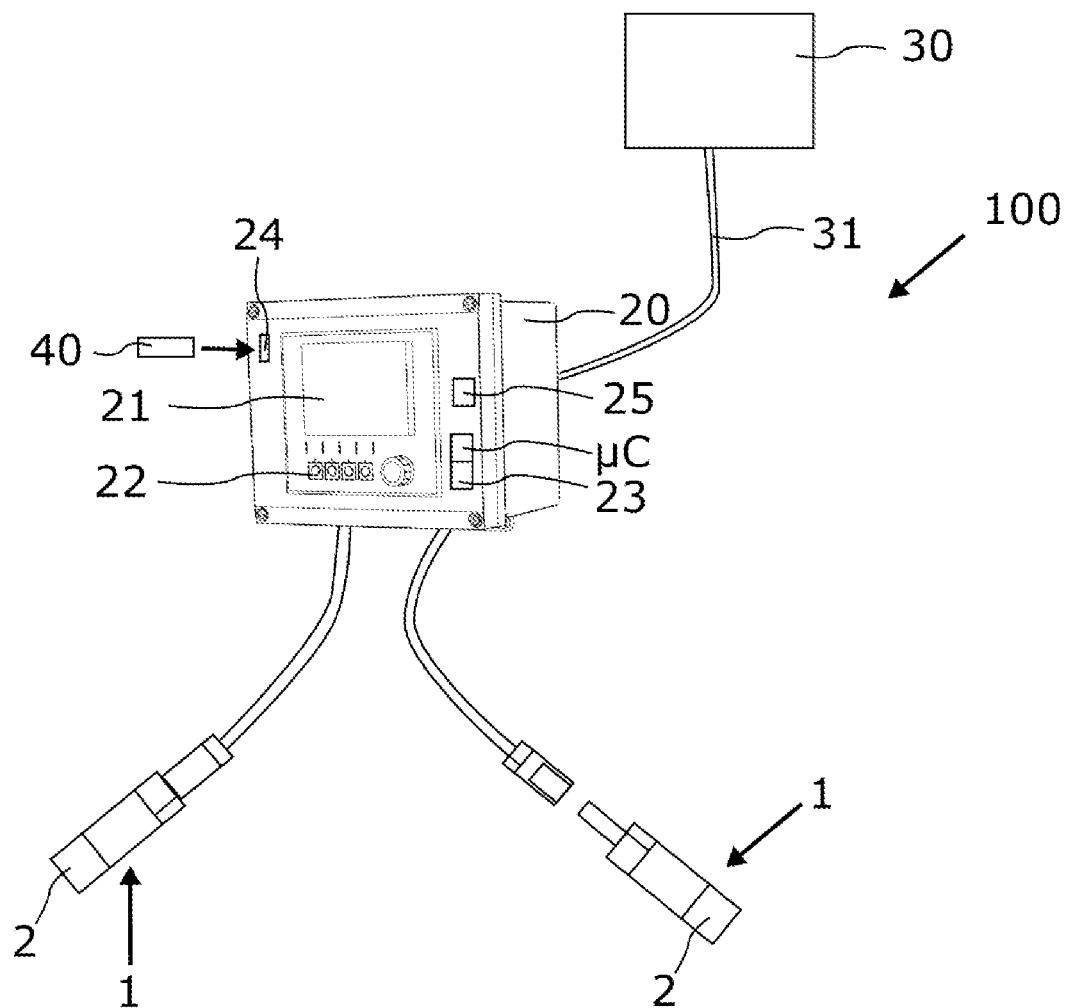
FIG. 1 shows the claimed measuring system in one embodiment.

In the figures, the same features are identified by the same reference signs.

DETAILED DESCRIPTION

In order to solve the problem of emergency access to field devices, especially a measuring transducer 20, in the OT environment, it is proposed in one embodiment to use a hardware token 40 (e.g., according to the FIDO2 standard). This token 40 must first be made known to the field device, whereby confidence is established. For this purpose, the token 40 is connected to the field device 20, i.e., for example, inserted, and the field device 20 is notified that it should store the public key of the token 40 and authorize this token for emergency access. The hardware token 40 can then be stored in a safe location and wait to be used. Conceivable storage locations are a safe in an office just like a key box with a breakable glass pane directly next to the field device.

In an emergency, i.e., if no employee with a sufficient account is available, access can be obtained with this hardware token.

This token does not necessarily have to satisfy the FIDO2 standard and does not necessarily have to be directly on the field device or necessarily inserted. Correct function according to this concept requires the hardware token 40 to have the properties of a "secure element," i.e., it must support the following possibilities: It must have a cryptographic key pair (e.g., RSA, or by means of elliptical curves). There must be an interface by means of which the public key can be read. A challenge-response method must be supported, i.e., after transmitting a "challenge" to the token, the token must encrypt or sign it using its private key and return it as a "response." The private key must in no way be readable. The token may not be copyable, i.e., it must be impossible to derive a second token with identical keys from a token.

During authentication, the field device 20 thus sends a "challenge" to the token 40 and uses the "response" to check whether the token 40 is actually in possession of the appropriate private key. Since the field device 20 uses a different challenge each time and the challenge is as random as possible, "replay" attacks are nearly impossible, and the token 40 can also connect to the field device 20 via a non-encrypted connection. This can be any plug-in connection 24 or a radio-based interface 25, such as Bluetooth Low Energy.

The special feature of the proposed solution is that it does not require any infrastructure. It is sufficient that the field device 20 can read and store a public key from a token and controls the mechanism for token checking using a challenge-response method.

Of course, such a token 40 can also be used for a plurality of field devices, i.e., the user is completely free to select which tokens should grant emergency access to which field devices. It is also possible to reveal more than just one token 40 to a field device 20 in the manner described, so that, for example, different organizational units can each be equipped with their own emergency token.

Another use is the instance of service in which the device 20 is sent to the manufacturer or a service provider for maintenance/repair. If the device has active user administration, the manufacturer or service provider cannot log into the device to perform the maintenance and repair tasks. The owner may not have previously set up an account for this purpose, and he also does not want to disclose a password of an existing account. This emergency token could then also be used for this "emergency" if it is possible to establish a connection between the token and field device via the Internet, for example. Alternatively, the token could also be enclosed with the field device or sent later. In the event of regular service, the service provider could permanently possess such a hardware token.

The figures are described in more detail below.

The claimed measuring system in its entirety is denoted by reference sign 100 and is shown in FIG. 1. The system 100 is used predominantly in process automation.

The measuring system 100 comprises a measuring transducer 20 and a token 40. Connected to the measuring transducer 20 are one or more sensors, which are denoted by reference sign 1. Without limitation of generality, a "sensor" is spoken of below; however, an actuator or the like may likewise be connected to the measuring transducer 20.

The measuring transducer 20 comprises a data processing unit for instance in the form of a microcontroller, and, separately therefrom or as part thereof, a memory 23. The public key is stored in the memory 23.

The measuring transducer must have a slot 24 for the token 40. The token 40 is, for example, a FIDO2 stick. The slot 24 is correspondingly designed, for example, as a USB port or a USB-C port. If the token 40 is then placed in the slot 24 in an emergency (indicated by the arrow), access to the measuring transducer 20 is granted as explained above.

Alternatively or additionally, the measuring transducer 20 comprises a wireless module 25, e.g., a Bluetooth module, wherein the Bluetooth module and the data processing unit µC support the low energy protocol stack, or an NFC module. It can also be a WLAN module.

There are various ways of designing the token 40. As mentioned, a slot 24 can be provided for a corresponding hardware token for this purpose. A smart device within the radio range of the measuring transducer 20 (see FIG. 2) can also function as a token. In a further embodiment, a corresponding token can be connected to the sensor interface of the measuring transducer 40.

The measuring transducer 20 is connected to the sensor 1 by a cable. A plurality of sensors 1 can also be connected to a measuring transducer 20. Two sensors 1 are shown in FIG. 1. The same or different sensors can be connected. The left one of the two is shown in the plugged-in state. Up to eight sensors, for example, can be connected to the measuring transducer 20.

The sensor 1 comprises at least one sensor element 2 for detecting a measured variable of process automation. The sensor 1 is then, for instance, a pH sensor, also called an ISFET design, generally an ion-selective sensor, a sensor for measuring the redox potential, the absorption of electromagnetic waves in the medium, for example with wavelengths in the UV, IR, and/or visible range, oxygen, conductivity, turbidity, the concentration of non-metallic materials, or the temperature with the respective measured variable.

The sensor 1 comprises a data processing unit, for instance a microcontroller, which processes the values of the measured variable, for instance converts them into another data format. For reasons of energy and space, the computing capacity and storage volume of the data processing unit is rather small and economical. The sensor 1 is thus designed only for "simple" computing operations, for instance for averaging, preprocessing, and digital conversion. The sensor 1 comprises one or more memories separately or as part of the data processing unit. The data processing unit of the sensor converts the value that is a function of the measured variable (i.e., the measurement signal of the sensor element 4) into a protocol that the measuring transducer 20 can understand.

The measuring transducer 20 comprises a display 21 and one or more operating elements 22, for instance buttons or rotary buttons, by means of which the measuring transducer 20 can be operated. Measured data of the sensor 1 are, for example, displayed by the display 21. The sensor 1 can also be configured and parameterized by means of the operating elements 22 and the corresponding view on the display 21.

The measuring transducer 20 forwards the measured data via the cable 31 to a control system 30. In this case, the control system 30 is designed as a process control system (PLC, SPS), PC, or server. For this purpose, the measuring transducer 20 converts the data into a data format that the control system can understand, for instance in a corresponding bus, such as HART, Profibus PA, Profibus DP, Foundation Fieldbus, Modbus RS485, or even an Ethernet-based field bus, such as EtherNet/IP, Profinet, or Modbus/TCP. These data are then forwarded to the control system 30. This may, if required, be combined with a web server; i.e., they may be operated in parallel with one another.

Figure 2:
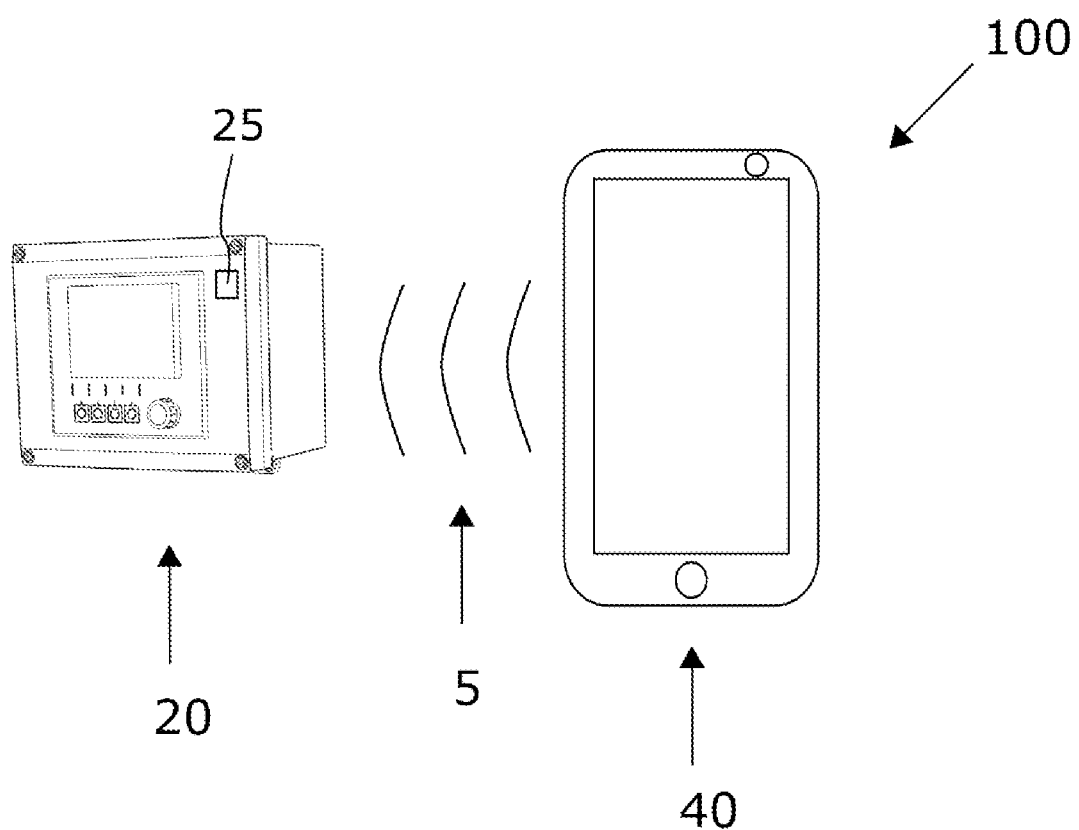
FIG. 2 shows the claimed measuring system in one embodiment.

FIG. 2 shows an embodiment. In this case, the token 40 is designed as a smart device, for example as a smartphone or tablet. A wireless connection 5 to the measuring transducer 20 is established, for instance by means of Bluetooth, for instance Bluetooth Low Energy. For this purpose, the measuring transducer 20 comprises a corresponding wireless module 25.

The invention claimed is:

1. A method for obtaining emergency device access for a field device in process automation technology via a security token, wherein the security token includes an encrypted memory area that is not readable from outside the encrypted memory area, wherein a private key is stored in the encrypted memory area, and wherein the private key and a public key form an asymmetric cryptosystem, the method comprising:
   (a) the field device receiving the public key if the public key is not yet on the field device, wherein one or more authorizations of an owner of the private key having access to the field device are linked to the public key;
   (b) storing the public key on the field device, wherein steps (a) and (b) are performed before an emergency occurs;
   (c) connecting the security token to the field device;
   (d) sending a challenge from the field device to the security token;
   (e) calculating a response to the challenge using the private key and sending the response from the security token to the field device; and
   (f) granting emergency access when the response is correct,
   wherein steps (c) through (f) are performed in the event of an emergency, and wherein the security token is protected against unauthorized use, but the protection can be overcome in an emergency.

2. The method according to claim 1, wherein the security token is a hardware token.

3. The method according to claim 2, wherein the hardware token is a FIDO2 stick.

4. The method according to claim 1, wherein the security token is a wireless smart device.

5. The method according to claim 1, wherein the public key is received in step (a) from the security token to the field device via WLAN, Bluetooth, NFC, USB, field bus, Ethernet, SD card, or a proprietary service interface.

6. The method according to claim 1, wherein the connection in step (c) from the security token to the field device takes place via WLAN, Bluetooth, NFC, USB, a proprietary service interface, or a sensor interface.

7. The method according to claim 1, wherein the asymmetric cryptosystem is designed as an RSA cryptosystem or elliptical curve cryptosystem.

8. The method according to claim 1, wherein only exactly one field device trusts the public key.

9. The method according to claim 1, wherein the challenge is random.

10. The method according to claim 1, wherein the protection can be irreversibly overcome in an emergency; the protection is destroyed; at least the use of the token is obvious.

\* \* \* \* \*